United States Patent Office 3,517,037
Patented June 23, 1970

3,517,037
4-AMINO-2-HALO-5-(2-HALO-α-HYDROXY-5-SUL-FAMOYLBENZYL) BENZENESULFONAMIDES
Stanley C. Bell, Penn Valley, Pa., assignor to American Home Products Corporation, New York, N.Y., a corporation of Delaware
No Drawing. Filed Feb. 12, 1968, Ser. No. 704,579
Int. Cl. C07c *143/80*
U.S. Cl. 260—397.7   6 Claims

ABSTRACT OF THE DISCLOSURE

This invention is concerned with 4-amino-2-halo-5-(2 - halo - α - hydroxy - 5 - sulfamoylbenzyl)benzenesulfonamides which are pharmacologically active as central nervous system depressants.

---

The present invention relates to new and novel 4-amino-2 - halo-5-(2-halo-α-hydroxy-5-sulfamoylbenzyl)benzenesulfonamides which in standard and accepted pharmacological tests have demonstrated central nervous system depressant activity.

The new and novel compounds of the present invention are exemplified by the following structural formula:

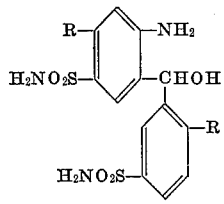

wherein both R's are the same and selected from the group consisting of hydrogen and halogen.

The new and novel compounds of the present invention are prepared by the process illustrated by the following reaction scheme:

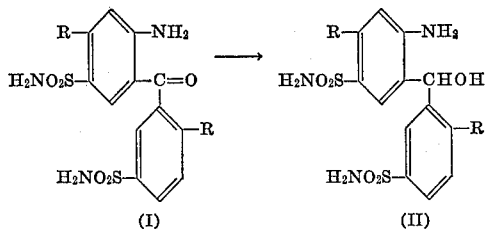

wherein R is defined as above. The reaction is effected by contacting an appropriate 4-amino-6-halo-3-(2-halo-5-sulfamoylbenzoyl)benzenesulfonamide (I) with a borohydride in a reaction-inert solvent. After a short period, e.g., fifteen minutes, the reaction mixture is diluted with water, acidified with a mineral acid, filtered and concentrated. Thereafter, the resulting solid is suspended in an organic solvent, e.g., ether, chloroform, benzene, and the like, then filtered and recrystallized from a suitable solvent, e.g., acetonitrile, to afford the corresponding 4 - amino-2-halo-5(2-halo-α-hydroxy-5-sulfamoylbenzyl) benzenesulfonamide (II).

The above-mentioned 4-amino-6-halo-3-(2-halo-5-sulfamoylbenzoyl)benzenesulfonamide (I) starting compounds may also be designated as 2-amino-2',4-dihalo-5,5'-disulfamoylbenzophenones. These compounds are readily prepared by the procedure described in copending U.S. Pat. application, Ser. No. 704,585, by Stanley C. Bell and entitled "5,5-disulfamoylbenzophenones," and filed on the same day as this application in the United States Patent Office. The borohydrides which may be employed in above reaction are commercially available and exemplified by sodium borohydride, potassium borohydride, tetraethylammonium borohydride and tetramethylammonium borohydride. By the term "reaction-inert solvent" as employed above is meant any liquid which will dissolve the reactants but not interfere with their interaction, e.g., lower alkanols and water. Other such solvents will readily suggest themselves to those skilled in the art of chemistry.

The new and novel compounds of the present invention have been found to possess interesting pharmacological properties which render them useful as central nervous system depressants. In the pharmacological evaluation of the central nervous system depressants of this invention the in vivo effects of the compounds of this invention are tested as follows:

The compound is administered intraperitoneally to three mice (14 to 24 grams) at each of the following dose: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plat method" [Nathan B. Eddy and Dorothy Leimbach, J. Pharmacol. Exper. Therap. 107 385 (1953)] is used to test for analgesia. The experiment is terminated by subjecting each animal to a maximal electroshock to test for anticonvulsant activity.

The compounds of this invention when administered intraperitoneally in the above test procedure decrease motor activity and respiration when administered at 40 mg./kilo. These are no deaths in the test animals at the highest dosage used, 400 mg./kg., intraperitoneally.

When the compounds of this invention are employed as central nervous system depressants in warm-blooded animals e.g. mice, rats, cats, dogs, guinea pigs and monkeys they may be administered alone or in combination with pharmacological acceptable carriers, the proportion of which is determined by the solubility and chemical nature of the compound, chosen route of administration and standard biological practice. For example, they may be administered orally in a solid form. They may also be administered orally in the form of solutions and suspensions or they may be injected parenterally. For parenteral administration they may be used in the form of a sterile solution containing other solutes, for example, enough saline or glucose to make the solution isotonic.

The dosage of the present biological agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

To a suspension of 10.0 g. of 4-amino-6-chloro-3-(2-chloro-5-sulfamoylbenzoyl)benzenesulfonamide in 100 ml. of ethanol, there is added a solution of 3.0 g. of sodium borohydride in 100 ml. of water. After fifteen minutes the clear solution is diluted with 100 ml. of water, acidified with hydrochloric acid, filtered from impurities and concentrated to one-half the volume. A sticky solid which formed is suspended in ether, filtered and recrystallized from a small volume of acetonitrile to afford 7.4 g. of 4-amino-2-chloro-5-(2-chloro-α-hydroxy-5-sulfamoylbenzyl)benzenesulfonamide, M. P. 218–220° C.

*Analysis.*—Calc'd for $C_{13}H_{13}Cl_2N_3O_5S_2$ (percent): C, 36.63; H, 3.07; Cl, 16.63; N, 9.86; S, 15.04. Found (percent): C, 35.99; H, 2.97; Cl, 16.49; N, 9.55 S, 14.97.

EXAMPLE II

Repeating the procedure of Example I to hydrogenate the following reactants, the hereinafter listed products are obtained:

| Reactants | Products |
|---|---|
| 4-amino-6-bromo-3-(2-bromo-5-sulfamoylbenzoyl)benzenesulfonamide. | 4-amino-2-bromo-5-(2-bromo-α-hydroxy-5-sulfamoylbenzyl)benzenesulfonamide. |
| 4-amino-6-fluoro-3-(2-fluoro-5-sulfamoylbenzoyl)benzenesulfonamide. | 4-amino-2-fluoro-5-(2-fluoro-α-hydroxy-5-sulfamoylbenzyl)benzenesulfonamide. |
| 4-amino-6-iodo-3-(2-iodo-5-sulfamoylbenzoyl)benzenesulfonamide. | 4-amino-5-(α-hydroxy-2-iodo-5-sulfamoylbenzyl)-2-iodobenzenesulfonamide. |
| 4-amino-3-(5-sulfamoylbenzoyl)benzenesulfonamide. | 4-amino-5-(α-hydroxy-5-sulfamoylbenzyl)benzenesulfonamide. |

What is claimed is:
1. A compound selected from the group consisting of those having the formula:

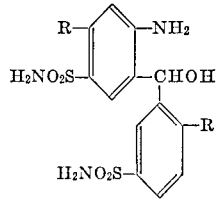

wherein both R's are the same and are selected from the group consisting of hydrogen and halogen.

2. A compound as described in claim 1 which is: 4-amino-2-chloro-5-(2-chloro - α - hydroxy-5-sulfamoylbenzyl)benzenesulfonamide.

3. A compound as described in claim 1 which is: 4-amino-2-bromo-5-(2-bromo - α - hydroxy-5-sulfamoylbenzyl)benzenesulfonamide.

4. A compound as described in claim 1 which is: 4-amino - 2 - fluoro-5-(2- - fluoro-α-hydroxy-5-sulfamoylbenzyl)benzenesulfonamide.

5. A compound as described in claim 1 which is: 4-amino - 5 - (α-hydroxy-2-iodo-5-sulfamoylbenzyl)-2-iodobenzenesulfonamide.

6. A compound as described in claim 1 which is: 4-amino - 5 - (α-hydroxy-5-sulfamoylbenzyl)benzenesulfonamide.

References Cited
UNITED STATES PATENTS
3,055,930  9/1962  Graf _____ 260—397.7

HENRY R. JILES, Primary Examiner
S. D. WINTERS, Examiner

U.S. Cl. X.R.
424—228